(No Model.)

P. BACHER.
ROLLER FOR ROLLER SKATES.

No. 341,206. Patented May 4, 1886.

WITNESSES

Peter Bacher  INVENTOR

Attorney

UNITED STATES PATENT OFFICE.

PETER BACHER, OF CANTON, OHIO.

ROLLER FOR ROLLER-SKATES.

SPECIFICATION forming part of Letters Patent No. 341,206, dated May 4, 1886.

Application filed October 17, 1885. Serial No. 180,121. (No model.)

*To all whom it may concern:*

Be it known that I, PETER BACHER, a citizen of the United States, and a resident of Canton, county of Stark, State of Ohio, have invented a new and useful Improvement in Rollers for Roller-Skates, of which the following is a full, clear, and exact description, reference being had to the accompanying drawings, making part of this specification.

My invention relates to an improvement in rollers for roller-skates; and it consists in providing a rubber tire and means for supporting the same.

My invention also relates to the adaptation and combination of parts, as herein described, and set forth in the claims.

Figure 1:
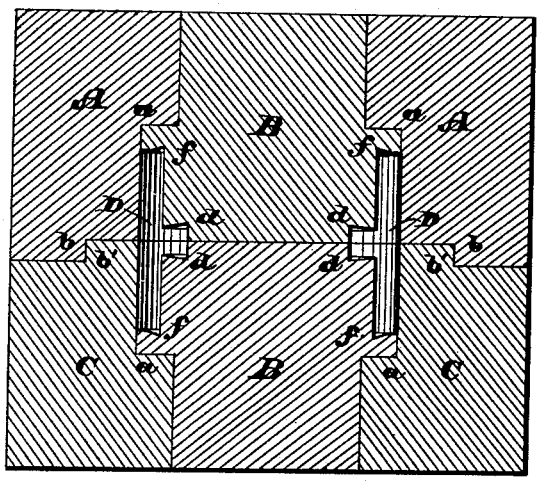
Figure 2:
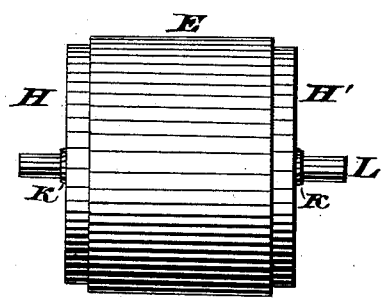
Figure 3:
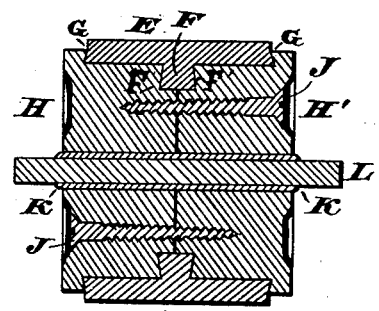

Figure 1 is a sectional view of mold for making my improved rubber tire. Fig. 2 is a view of roller complete. Fig. 3 is a sectional view of roller.

Letters A and B, Fig. 1, show the two parts of the mold. The block A is turned out, forming an aperture through the block, the diameter of which should be about two inches to the depth of three-fourths of one inch. The balance of the distance about one and three-eighths of one inch in diameter. The shoulder $a$, formed by the change of the diameter of the two sections of the aperture, should be faced to a right angle with the sides of the perforations. The face side of the block A is also recessed, as shown at $b$, to receive the block C, which is a duplicate of A, excepting that this block has an elevated section, $b'$, which is adapted to the recess $b$ in block A. The center die, B, is adapted to the aperture in block A, one end of the die being reduced in diameter, forming the shoulders $d$ and $f$. The angle of these shoulders should be such as to form a dovetail groove when the two parts of the mold are brought together. The mold D may then be filled with plastic rubber, and when clamped together, and the rubber vulcanized in the usual way, a vulcanized rubber tire or ring, as shown by letter E, Fig. 3, (sectional view,) will be formed, having an internal annular flaring or dovetailed rib, F, and annular flaring or dovetailed edges G. The hub or tire-support H H' may be made of hard-pressed paper or of wood or metal. I prefer the paper, as it is light and not liable to split. The shoulders G' and F' are adapted to the flaring or dovetailed sections of the tire G and F, and when the two sections H and H' are brought together and secured by the screw J the tire will be embraced and securely held in position by the shoulders G' and F'. The metal tube K, extending through the center of the hub-blocks H and H' forming the tire-support, is central to the blocks and tire, and is so adapted as to hold the parts in coincidence and provide a durable material to support the weight that may be brought to bear upon the roller. The supporting-pin L, by which the roller is supported and attached to the downwardly-projected members of a foot-piece of a roller-skate, may be of any of the well-known and approved forms or kinds.

The advantages of a roller of this form and construction are numerous. They are noiseless, not liable to slip, are durable, and in every way more comfortable to the user, as the constant noise and jar of a wood or hard-faced roller is not only annoying, but very injurious when used by a nervous person.

With this form of roller I prefer to use but two rollers to a skate.

Having described the nature and operation of my invention, what I desire to secure by Letters Patent is—

1. In a skate-roller, an elastic tire having a central internal annular dovetail or flaring tenon or rib, F, and dovetailed or flaring edges G, substantially as described, and for the purpose described.

2. In a skate-roller, the combination, with a sectional or two-part body having undercut shoulders G' F', of the elastic tire having beveled sides and a dovetail section adapted to be clamped between the shoulders of the two-part body, substantially as set forth.

3. The combination, with the two-part body having undercut shoulders and a hollow spindle or tube secured within said sections, of the elastic tire having beveled side edges and a dovetail tenon, substantially as set forth.

In testimony whereof I have hereunto set my hand this 16th day of October, A. D. 1885.

PETER BACHER.

Witnesses:
W. K. MILLER,
E. DAVIS.